Patented Nov. 6, 1934

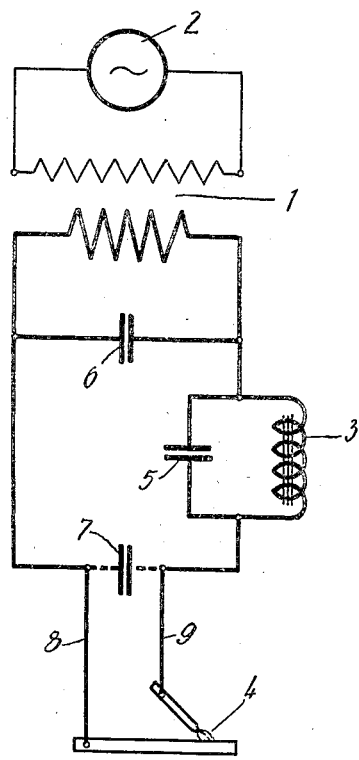

1,979,944

UNITED STATES PATENT OFFICE 1,979,944

ELECTRIC ARC WELDING

Hans Kost, Bergen, Germany, assignor to Ewald Schniewind, New York, N. Y.

Application August 6, 1932, Serial No. 627,747
In Germany August 14, 1931

13 Claims. (Cl. 219—8)

My invention relates to an improvement in electric arc welding.

Electric arc welding with alternating current is usually carried out in such a manner that the supply voltage is lowered by means of a suitable transformer (hereinafter termed welding transformer) to the desired arc voltage and then supplie. to the point of welding through a reaction coil (hereinafter termed welding reactor). This welding reactor in connection with the stray inductance of the welding transformer serves as current limiting device. One pole is connected to the welding rod, the other to the work to be welded. Although this simple and economical arrangement has certain drawbacks as compared with electric arc welding by direct current, it nevertheless will always have many supporters in view of the low cost of the apparatus, the absence of movable parts and of the high efficiency, viz., 60–70 per cent as compared with 30–40 per cent in the case of direct current. The drawbacks of the welding with alternating current are due to the fact that the arc is extinguished and must be again ignited at each alternation of current, which occurs only at a voltage which is considerably higher than the arc voltage. The secondary no-load voltage of the welding transformer must consequently be kept at a much higher value than the arc voltage which latter amounts to about 18–26 volts. On the other hand, the no-load voltage varies within a wide range depending on the electrode material; in the case of protected welding rods it amounts to about 45–50 volts whereas the voltage necessary for bare electrodes amounts to about 120 volts.

The difference between the no-load and arc voltage must be suppressed by the welding reactor or by the stray inductance of the transformer.

The self-induction present in the welding circuit brings about a great phase displacement during the welding operation. As a result of the great phase displacements, the transformer must, therefore, have a sufficiently high rating. The transformer thus becomes comparatively expensive.

Not only in view of the dimensioning of the welding transformer is it desirable to lower the no-load voltage, but also because a high no-load voltage may be dangerous to the operator, particularly when he stands on a wet floor, inasmuch as one electrode is permanently connected to ground through the work. To remove this danger, it has already been proposed to use series-connected relays which switch in the no-load voltage as soon as the welding rod contacts with the work. This measure is, however, not quite safe, since the relays may fail to operate owing to a sticking of the contacts. Another means for the lowering the welding voltage consists in the superposition of a current of high frequency upon the welding current proper; the high-frequency current is harmless, but suffices to ignite the arc. This method, however, requires expensive additional apparatus. A further possibility of maintaining the no-load voltage at a low value consists, as above described, in the use of protected welding rods, the sheath of which contains chemical substances which cause a strong emission of electrons.

But apart from the fact that these substances cannot be employed with all kinds of iron, they cause the formation of a considerable amount of slag, so that in some instances the subsequent removal of the slag from the welding seam encounters great difficulties and requires a certain skill on the part of the operator.

The object of my invention is to overcome the foregoing difficulties. In order to ignite and maintain the arc, the latter is impressed according to the invention with self-generated impulse oscillations (surges) with the result that the increased voltages occur only during the ignition of the arc and disappear upon the extinction of the same, so that the operator is not exposed to any danger. Furthermore, movable parts for the production of the ignition voltage are avoided.

In the accompanying drawing an arrangement for carrying out the method according to my invention is illustrated in a diagrammatic form.

Referring to the drawing, the numeral 1 denotes a welding transformer connected to the alternating-current source 2. 3 is a reactor connected in series with the secondary winding of the welding transformer 1. 4 is the welding arc. According to the invention a capacitor 5 is connected in parallel relation to the reactor 3. By the use of the reactor 3, the transformer may also be operated with a slight stray. The reactor 3 is so dimensioned as to limit the welding current or short-circuit current to a desired value. It has been found that the magnitude of the reactor for a welding current of about 100 amp. must be of the order of 0.001 henry.

The magnitude of the capacitor 5 may in this case vary between 10 and 100 microfarads; as a rule the magnitude of the capacitor 5 is of order of about 50 to 80 microfarads.

The operation of the arrangement illustrated in the drawing is as follows. The current or voltage variations occur at an interval at which the current attains or has attained its zero value, thus setting up oscillations of a frequency of from 10 to 100 times the supply frequency in the oscillatory circuit consisting of the capacitor 5 and the reactor 3. The amplitude of these oscillations depends upon the attenuation effect of the oscillatory circuit 3, 5. It is, therefore, necessary that the oscillation circuit should have the slightest possible attenuating effect upon the self-generated oscillations. The above-described oscillations are superposed upon the supply voltage and act at the very instant when the arc breaks due to the shock or impulse produced by this break in such a manner as to cause a new ignition or to bring about a smooth operation of the arc.

In this respect the present invention is distinguished essentially from the several prior art methods, insofar as the self-inductance and capacities which are there connected in parallel to the arc do not serve in the present case as exciters for natural oscillations, or rather impulse oscillations within the arc. In other words, so far as the present shock oscillations are concerned the arc is not the seat of these oscillations. These auxiliary oscillations are produced according to the invention by the magnetic energy which is accumulated in the chocking impedance which energy accordingly has its source there and not in the arc. This inductance forms together with a capacity connected in parallel to it an oscillatory circuit, and this circuit utilizes the extinguishing arc as a path for the gradually decaying oscillations.

The gradual decay of the oscillations occurs from the moment of the extinction of the arc, previous to this, according to well-known physical laws these impulse oscillations cannot occur. They are the more powerful, the more sudden the extinction occurs. On the other hand, the ionized condition of the arc must still prevail, otherwise it cannot serve as a discharge path for the oscillations. This entire occurrence takes place at each alternation of the primary alternating current.

Now electric and magnetic energy are exchanged back and forth until the primary voltage supplied to the arc has resumed a value at which the arc can re-ignite anew. Thereupon the still present impulse oscillations considerably depress the peak of the igniting voltage and thus the re-ignition of the welding arc occurs earlier and smoothly.

One must visualize that all these individual occurrences take place within time periods of 1/1,000,000 of a second and follow exactly their own laws irrespective of whether at the same time the primary supply current alternates in 1/100 of a second. The arc is not extinguished for these impulse oscillations and remains passable for them, while it must extinguish as a welding arc owing to the momentary lack of primary energy supplied.

In order that the secondary winding of the transformer 1 may not act as an impedance for the oscillations, it is preferable to connect a capacitor 6 in parallel relation to the secondary winding. The magnitude of this capacitor may be of the order of from 5 to 30 microfarads. The capacitor 6 may also be connected in parallel to the primary winding of the transformer 1. In some instances, it may be preferable to insert a small capacitor 7 in parallel relation to the supply leads 8 and 9 so as to enhance the smooth operation of the arc.

This condenser is, however, not absolutely necessary. If the coil 3 is provided with an iron core and the iron core is saturated only to a slight extent, substantially sine waves of a given frequency will be obtained as in the case of coreless coils. In order to effect a saving in material the coil 3 may, however, be caused to act in the zone of saturation. It will not then be possible to obtain exact sine waves owing to the core permeability characteristics, the permeability depending largely upon the intensity of the current. Furthermore, the frequency of the generated voltages will not be quite constant. These oscillations which may be considered as a kind of saturation zone oscillations will be termed hereinafter as such.

These oscillations may also be produced according to the invention with the aid of a capacitor connected in parallel relation to the transformer which capacitor may co-act with the stray inductance or the main inductance of the transformer in the same manner as the capacitor 5 co-acts with the inductance 3. It is, therefore, also possible to cause the transformer 1 to operate in the zone of saturation. When using the transformer 1 for the production of saturation zone oscillations, the capacitor may also be connected in parallel relation to the primary winding. The present invention has however nothing to do with the conventional parallel connection of capacitors to the windings of the welding transformer in order to improve the phase angle. It is also immaterial whether a transformer is connected to one or more phases or carries a load.

If the transformer itself is used to produce impulse or saturation zone oscillations it is preferable to connect also a capacitor in parallel relation to the reactor 3 in order that the oscillations produced will not be attenuated by this reactor.

Instead of using an inductive reactance as current limiting device in connection with a capacitor for the production of saturation zone oscillations a reactor of a special type may be employed for this purpose.

A further method of facilitating the ignition which may be applied, if desired, together with the above-described method consists in the amplification of harmonics contained in the alternating current to be supplied or in the production of harmonic waves with the aid of coils, energized by the welding current and operating in the zone of core saturation or with the aid of transformers with iron cores. An enhancement of the effect of the harmonics is possible by a proper selection of the number of turns and by the employment of capacitors which may be tuned together with the inductances of the connection to resonance with one or more harmonics so that the harmonic voltage attains values which facilitate the ignition.

By the use of the above described means it is possible to lower the no-load voltage of the transformer to 35 volts in the case of protected electrodes and to about 50 volts in case of bare welding rods.

I claim as my invention:

1. Means for maintaining an alternating current arc for arc welding, comprising a welding transformer connected to the alternating current supply, a welding circuit including the secondary transformer winding, the arc and a current limiting impedance, and a capacity connected in parallel to said impedance, said capacity being suitably dimensioned to form with said impedance an oscillatory circuit resonant to high frequency oscillations generated in it by the impulse due to the extinction of the arc, for superposing upon the arc in its state of extinction voltages at said frequencies, capable of re-igniting and maintaining said arc.

2. Means for maintaining an alternating current arc for arc welding, comprising a welding transformer connected to the alternating current supply, a welding circuit including the secondary transformer winding, the arc and a current limiting impedance having a saturated iron core, and a capacity connected in parallel to said impedance, said capacity being suitably dimensioned to form with said impedance an oscillatory circuit resonant to high frequency oscillations generated in it by the impulse, due to the extinction of the arc, for superposing upon the arc in its state of extinction voltages at said frequencies, capable of re-igniting and maintaining said arc.

3. Means for maintaining an alternating current arc for arc welding, comprising a welding transformer connected to the alternating current supply, a welding circuit including the secondary transformer winding, the arc and a current limiting impedance, and a capacity connected in parallel to said impedance, said capacity being suitably dimensioned to form with said impedance an oscillatory circuit resonant to high frequency oscillations generated in it by the impulse, due to the extinction of the arc, for superposing upon the arc in its state of extinction voltages at said frequencies, capable of re-igniting and maintaining said arc, and a capacity connected in parallel to said secondary transformer winding for by-passing said high frequency oscillations around said secondary winding.

4. Means for maintaining an alternating current arc for arc welding, comprising a welding transformer connected to the alternating current supply, a welding circuit including the secondary transformer winding, the arc and a current limiting impedance, and a capacity connected in parallel to said impedance, and a capacity connected in parallel to said secondary transformer winding, said capacities and the windings included in said secondary transformer circuit being suitably dimensioned to amplify higher harmonics of the frequency of the alternating current supplied, for superposing upon the arc voltages of higher harmonic frequencies, capable of igniting and maintaining said arc.

5. Means for maintaining an electric arc for arc welding, comprising a main circuit for supplying current to the arc and means including an oscillatory circuit tuned to high frequency oscillations generated in it by the impulse due to the extinction of the arc, for superposing upon the arc gap a high frequency voltage, capable of re-igniting the arc.

6. Means for maintaining an electric arc for arc welding, comprising a main circuit containing inductance and including the arc, for supplying current to said arc, and an oscillatory circuit in series with said main circuit and including said inductance and being tuned to high frequency oscillations generated in said oscillatory circuit by the impulse due to the extinction of the arc, for producing high frequency energy from the electromagnetic energy stored in said inductance during the previous operation of the arc, for superposing upon the arc gap a high frequency potential capable of re-igniting the arc.

7. Means for maintaining an electric arc for arc welding, comprising a main circuit containing inductance and including the arc, for supplying current to said arc, and an oscillatory circuit in series with said main circuit and including said inductance and being tuned to high frequency oscillations generated in said oscillatory circuit by the impulse due to the extinction of the arc, for producing high frequency energy from the electromagnetic energy stored in said inductance during the previous operation of the arc, for superposing upon the arc gap in the state of arc extinction a high frequency potential capable of re-igniting the arc.

8. Means for maintaining an electric arc for arc welding, comprising a main circuit containing a saturated core impedance and including the arc, for supplying current to said arc, and an oscillatory circuit in series with said main circuit and including said impedance and being tuned to high frequency oscillations generated in said oscillatory circuit by the impulse due to the extinction of the arc, for producing high frequency energy from the electromagnetic energy stored in said impedance during the previous operation of the arc, for superposing upon the arc gap in the state of arc extinction a high frequency potential capable of re-igniting the arc.

9. Means for maintaining an alternating current arc, comprising a welding transformer connected to the alternating current supply, a circuit including the secondary transformer winding, the arc and a current limiting impedance, and a capacity connected in parallel to said impedance, said capacity being suitably dimensioned to form with said impedance an oscillatory circuit resonant to high frequency oscillations generated in it by the impulse, due to the extinction of the arc, for superposing upon the arc in its state of extinction voltages at said frequencies, capable of re-igniting and maintaining said arc.

10. Means for maintaining an alternating current arc, comprising a welding transformer connected to the alternating current supply, a circuit including the secondary transformer winding, the arc and a current limiting impedance, and a capacity connected in parallel to said impedance, said capacity being suitably dimensioned to form with said impedance an oscillatory circuit resonant to high frequency oscillations generated in it by the impulse, due to the extinction of the arc, for superposing upon the arc in its state of extinction voltages at said frequencies, capable of re-igniting and maintaining said arc, and a capacity connected in parallel to said secondary transformer winding for by-passing said high frequency oscillations around said secondary winding.

11. Means for maintaining an alternating current arc, comprising a welding transformer connected to the alternating current supply, a circuit including the secondary transformer winding, the arc and a current limiting impedance, and a capacity connected in parallel to said impedance, and a capacity connected in parallel to said secondary transformer winding, said capacities and the windings included in said secondary transformer circuit being suitably dimensioned to amplify higher harmonics of the frequency of the alternating current supplied, for superposing upon the arc voltages of higher harmonic frequencies, capable of igniting and maintaining said arc.

12. Means for maintaining an electric arc, comprising a main circuit for supplying current to the arc and means including an oscillatory circuit tuned to high frequency oscillations generated in it by the impulse due to the extinction of the arc, for superposing upon the arc gap a high frequency voltage, capable of re-igniting the arc.

13. Means for maintaining an electric arc, comprising a main circuit containing inductance and including the arc, for supplying current to said arc, and an oscillatory circuit in series with said main circuit and including said inductance and being tuned to high frequency oscillations generated in said oscillatory circuit by the impulse due to the extinction of the arc, for producing high frequency energy from the electromagnetic energy stored in said inductance during the previous operation of the arc, for superposing upon the arc gap in the state of arc extinction a high frequency potential capable of re-igniting the arc.

HANS KOST.

CERTIFICATE OF CORRECTION.

Patent No. 1,979,944.   November 6, 1934.

HANS KOST.

It is hereby certified that error appears in the printed specification of the above numbered patent requiring correction as follows: Page 3, lines 100, 113 130, claims, 9, 10 and 11 respectively, strike out the word"welding"; and that and the said Letters Patent should be read with these corrections therein that the same may conform to the record of the case in the Patent Office.

Signed and sealed this 22nd day of January, A. D. 1935.

(Seal)

Leslie Frazer
Acting Commissioner of Patents.